United States Patent
Zheng

(10) Patent No.: US 12,200,330 B2
(45) Date of Patent: Jan. 14, 2025

(54) RANGING CAMERA DEVICE

(71) Applicant: FUJIAN HUICHUAN IOT TECHNOLOGY CO., LTD., Fujian (CN)

(72) Inventor: Wen Zheng, Fujian (CN)

(73) Assignee: FUJIAN HUICHUAN IOT TECHNOLOGY CO., LTD., Fujian (CN)

( * ) Notice: Subject to any disclaimer, the term of this patent is extended or adjusted under 35 U.S.C. 154(b) by 134 days.

(21) Appl. No.: 18/005,703

(22) PCT Filed: Mar. 16, 2021

(86) PCT No.: PCT/CN2021/081146
§ 371 (c)(1),
(2) Date: Jan. 17, 2023

(87) PCT Pub. No.: WO2022/037050
PCT Pub. Date: Feb. 24, 2022

(65) Prior Publication Data
US 2023/0283867 A1 Sep. 7, 2023

(30) Foreign Application Priority Data

Aug. 21, 2020 (CN) .......................... 202010853632.8

(51) Int. Cl.
*H04N 23/51* (2023.01)
*H04N 23/54* (2023.01)
*H04N 23/695* (2023.01)

(52) U.S. Cl.
CPC ............. *H04N 23/51* (2023.01); *H04N 23/54* (2023.01); *H04N 23/695* (2023.01)

(58) Field of Classification Search
CPC ...... H04N 23/51; H04N 23/54; H04N 23/695; H04N 23/50; G01C 3/00; G01C 3/02
See application file for complete search history.

(56) References Cited

U.S. PATENT DOCUMENTS

2004/0161231 A1* 8/2004 Hosokawa ........... G03B 17/425
  396/411
2009/0073388 A1* 3/2009 Dumm ................. G03B 17/561
  352/243

(Continued)

FOREIGN PATENT DOCUMENTS

CN 104390112 A 3/2015
CN 207945441 U 10/2018

(Continued)

OTHER PUBLICATIONS

International Search Report and Written Opinion cited in Application No. PCT/CN2021/081146 mailed May 28, 2021, 12 pgs.

*Primary Examiner* — Mekonnen D Dagnew
(74) *Attorney, Agent, or Firm* — BEKIARES ELIEZER LLP

(57) ABSTRACT

A ranging camera device includes a body, a horizontal rotating shaft, a conductive ring, a worm gear mechanism, and a first motor. The horizontal rotating shaft is inserted into the body and is connected to the worm gear mechanism; the conductive ring is inserted into the horizontal rotating shaft to prevent a wire from being damaged in a rotating process; the worm gear mechanism is provided on the body and is connected to the first motor; the first motor is provided on the body; the first motor provides rotating force to the horizontal rotating shaft by means of a worm wheel and a worm, and the first motor drives the body to rotate around the axis of the horizontal rotating shaft under the counteracting force transmitted by the horizontal rotating shaft.

20 Claims, 2 Drawing Sheets

(56) References Cited

U.S. PATENT DOCUMENTS

2022/0179192 A1* 6/2022 Wu .......................... G02B 7/02
2024/0007750 A1* 1/2024 Liao ...................... H04N 23/50

FOREIGN PATENT DOCUMENTS

| | | |
|---|---|---|
| CN | 208015889 U | 10/2018 |
| CN | 111982060 A | 11/2020 |
| CN | 212340226 U | 1/2021 |
| KR | 101444312 B1 | 9/2014 |

* cited by examiner

RANGING CAMERA DEVICE

CROSS-REFERENCES TO RELATED APPLICATIONS

The present application is a U.S. National Stage under 35 U.S.C. § 371 of International Application No. PCT/CN2021/081146 filed on Mar. 16, 2021, which claims the benefit of Chinese Patent Application No. 202010853632.8 filed on Aug. 21, 2020 with the China Patent Office entitled "Ranging Camera Device". The entire contents of each of these applications are incorporated herein by reference in its entirety.

TECHNICAL FIELD

The present disclosure relates to the field of mechanical technology, and in particular, to a ranging camera device.

BACKGROUND ART

The ranging camera device is mostly used for remote surveying and mapping, monitoring, panoramic shooting and other operations. Most of the omnidirectional ranging camera devices are equipped with two rotation axes to achieve multi-directional image acquisition. Generally, the rotation of the rotation axes is driven by a first motor, or by a synchronous pulley. However, the transmission ratio is lower, hereby the transmission accuracy is lower, so that engineering operations are prone to large errors.

SUMMARY

The purpose of the embodiment of the present disclosure includes, for example, providing a ranging camera device, which has improved transmission accuracy by configuring a worm gear and a worm screw, thereby improving the stability during rotation, and avoiding wire entanglement by using a conductive ring.

An embodiment of the present disclosure provides a ranging camera device, including a body, a horizontal rotating shaft, a conductive ring, a worm gear mechanism, and a first motor; the horizontal rotating shaft is inserted into the body and connected to the worm gear mechanism; the conductive ring is inserted into the horizontal rotating shaft to prevent the wire from being damaged during rotation; the worm gear mechanism is arranged on the body and connected to the first motor; the first motor is arranged on the body; the first motor provides rotational force for the horizontal rotating shaft through a worm gear and a worm screw; and the first motor drives the body to rotate around the axis of the horizontal rotating shaft under the reaction force transmitted by the horizontal rotating shaft.

In the above implementation process, the ranging camera device includes a body, a horizontal rotating shaft, a conductive ring, a worm gear mechanism and a first motor, the horizontal rotating shaft is inserted in the body, and is connected with the worm gear mechanism, and the conductive ring is inserted in the horizontal rotating shaft, which can prevent wires from being twisted and damaged during rotation. The worm gear mechanism is set on the body and connected to the first motor. The first motor is set on the body. The first motor transmits the rotational force to the worm gear mechanism, and then the worm gear mechanism transmits the rotational force to the horizontal rotating shaft, so that the horizontal rotating shaft reacts on the worm gear mechanism through the rotational force, and further acts on the first motor, so that the first motor can drive the body to rotate around the axis of the horizontal rotating shaft, and the worm gear mechanism can ensure the stability of the body during rotation with larger transmission ratio and can effectively improve the accuracy.

Optionally, a first through hole is provided along the axis in the horizontal rotating shaft; and the conductive ring is inserted into the first through hole.

Optionally, the stator of the conductive ring is fixedly connected to the horizontal rotating shaft, and the rotor of the conductive ring is connected to the body through wires.

In the above implementation process, the first through hole is set in the horizontal rotating shaft along the direction of the axis, and the conductive ring is set in the first through hole. The setting of the conductive ring can prevent the wire connected to the body from being twisted due to relative rotation between the body and the horizontal rotating shaft, so as to avoid the damage of the wire.

Optionally, the worm gear mechanism includes a worm gear and a worm screw; the worm gear is sleeved on the horizontal rotating shaft and connected to the worm screw; and the worm screw is arranged on the body and connected to the first motor.

In the above implementation process, the worm gear mechanism includes a worm gear and a worm screw, the worm gear is sleeved on the horizontal rotating shaft, and connected with the worm screw, and the worm screw is arranged on the body, and connected with the first motor, so that the transmission ratio and precision can be increased through the cooperation of the worm gear and the worm screw, so that the rotation of the body is more stable and precise.

Optionally, one end of the horizontal rotating shaft connected to the worm gear mechanism is provided with a grating detection part; and the grating detection part is sleeved on the horizontal rotating shaft for detecting the rotation angle of the body relative to the horizontal rotating shaft.

In the above implementation process, a grating detection part is set at the end where the horizontal rotating shaft and the worm gear mechanism are connected, and the grating detection part is sleeved and fixed on the horizontal rotating shaft. When the horizontal rotating shaft make the first motor drive the body to rotate through the reaction force, the grating detection part can detect and obtain the rotation angle of the body relative to the horizontal rotating shaft, so as to provide working data for subsequent engineering operations.

Optionally, a tapered surface is provided at the connection position between the grating detection part and the horizontal rotating shaft; a tapered boss cooperating with the tapered surface is provided at the end of the horizontal rotating shaft connected to the grating detection part; and the horizontal rotating shaft is closely connected with the grating detection part through the tapered surface and the tapered boss.

In the above implementation process, a tapered surface is provided at the connection position between the grating detection part and the horizontal rotating shaft, and a tapered boss capable of cooperating with the above-mentioned tapered surface is provided at the end of the horizontal rotating shaft connected to the grating detection part. When the horizontal rotating shaft and the grating detection part is connected, the side surface of the tapered boss can be closely attached to the tapered surface, to ensure the tight connection between the horizontal rotating shaft and the grating detection part, and avoid measurement errors caused by installation gaps.

Optionally, the body includes a pan-tilt, a vertical rotating shaft, a ranging camera portion and a second motor; the pan-tilt is connected to the horizontal rotating shaft; the vertical rotating shaft is inserted into the pan-tilt, and is connected to the second motor; the two ends of the ranging camera portion are connected with the vertical rotating shaft respectively; the second motor is arranged on the pan-tilt.

In the above implementation process, the body includes a pan-tilt, a vertical rotating shaft, a ranging camera portion and a second motor, the pan-tilt is connected to the horizontal rotating shaft, the vertical rotating shaft is inserted in the pan-tilt and connected with the second motor, two ends of the ranging camera portion are respectively connected to the vertical rotating shaft, the second motor is arranged on the pan-tilt, and the pan-tilt rotates under the reaction force of the horizontal rotating shaft, and further drives the vertical rotating shaft to rotate around the axis of the horizontal rotating shaft, so that the ranging camera portion finally rotates around the axis of the horizontal rotating shaft. The vertical rotating shaft can drive the ranging camera portion to rotate around the axis of the vertical rotating shaft actuated by the second motor, thereby realizing the adjustment of the horizontal angle and pitch angle of the ranging camera portion.

Optionally, the platform includes a first support arm and a second support arm; the vertical rotating shaft is respectively inserted into the first support arm and the second support arm; the ranging camera portion is set between the first support arm and the second support arm; and the second motor is arranged on the first support arm.

Optionally, the vertical rotating shaft can rotate relative to the first support arm and the second support arm.

Optionally, the length of the first support arm and the second support arm can be lengthened so that the ranging camera portion can be rotated. Optionally, the rotation angle is 360°.

In the above implementation process, the pan-tilt includes a first support arm and a second support arm, the vertical rotating shaft is inserted in the first support arm and the second support arm respectively, and the ranging camera portion is arranged between the first support arm and the second support arm, the second motor is arranged on the first support arm, so that the pan-tilt can drive the vertical rotating shaft to rotate through the first support arm and the second support arm, while the vertical rotating shaft will not affect the work of other structures when driving the ranging camera portion to rotate.

Optionally, the body also includes a worm gear assembly; the worm gear assembly is disposed on the first support arm, sleeved on the vertical rotating shaft and connected to the second motor.

In the above implementation process, the body also includes a worm gear assembly, which is arranged on the first support arm, sleeved on the vertical rotating shaft and connected to the second motor. The worm gear assembly can improve the transmission ratio and transmission accuracy, whereby the rotation of the vertical rotating shaft is more stable and precise, reducing the error.

Optionally, the ranging camera device further includes a connecting base; the connecting base is connected to the horizontal rotating shaft and used for connecting with external equipment.

Optionally, the ranging camera device can be installed and fixed on the external equipment through the connecting base.

In the above implementation process, the ranging camera device also includes a connecting base, which is connected to the horizontal rotating shaft and connected to external equipment, so that the ranging camera device can be installed and fixed on the external equipment, hereby the ranging camera device can work.

Optionally, the ranging camera device further includes a flange assembly; one end of the flange assembly is connected to the horizontal rotating shaft, and the other end of the flange assembly is connected to the connecting base.

In the above implementation process, the ranging camera device also includes a flange assembly, one end of the flange assembly is connected to the horizontal rotating shaft, the other end is connected to the connecting base, so that the horizontal rotating shaft and the connecting base can be connected and fixed together, such that the horizontal rotating shaft can provide a reaction force to make the body rotate.

Other features and advantages of the present disclosure will be set forth in the following description, or some of the features and advantages can be inferred or unambiguously determined from the description, or can be known by implementing the above-mentioned techniques of the present disclosure.

In order to make the above-mentioned purpose, features and advantages of the present application more comprehensible, preferred embodiments will be described in detail below together with the drawings.

BRIEF DESCRIPTION OF DRAWINGS

In order to illustrate the technical solutions of the embodiments of the present disclosure more clearly, the drawings that need to be used in the embodiments of the present disclosure will be briefly introduced below. It should be understood that the following drawings only show some embodiments of the present disclosure, it should not be regarded as a limitation on the scope, and those ordinarily skilled in the art can also obtain other related drawings according to these drawings without creative work.

Figure 1:
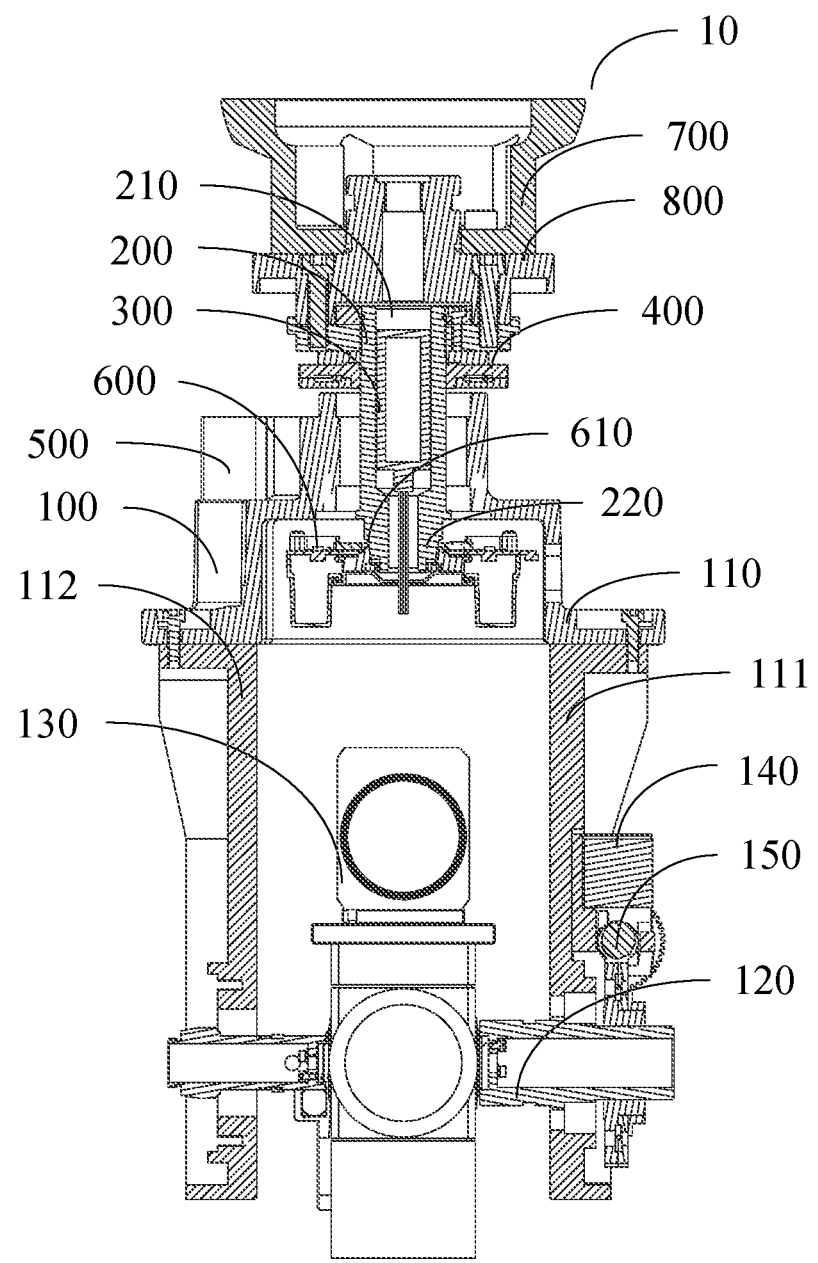
FIG. 1 is a schematic sectional view of a ranging camera device provided in the embodiment of the present disclosure.

Reference signs: 10—ranging camera device; 100—body; 110—pan-tilt; 111—first support arm; 112—second support arm; 120—vertical rotating shaft; 130—ranging camera portion; 140—second motor; 150—worm gear assembly; 200—horizontal rotating shaft; 210—first through hole; 220—tapered boss; 300—conductive ring; 400—worm gear mechanism; 410—worm gear; 420—worm screw; 500—first motor; 600—grating detection part; 610—tapered surface; 700—connecting base; 800—flange assembly.

DETAILED DESCRIPTION OF EMBODIMENTS

The following will clearly and completely describe the technical solutions in the embodiments of the present disclosure with reference to the drawings in the embodiments of the present disclosure. Apparently, the described embodiments are only part of the embodiments of the present disclosure, not all of them. The components of the embodiments of the present disclosure generally described and illustrated in the drawings herein may be arranged and designed in a variety of different configurations. Accordingly, the following detailed description of the embodiments of the present disclosure provided in the drawings is not intended to limit the scope of the claimed disclosure, but merely represents selected embodiments of the present disclosure. Based on the embodiments of the present disclosure, all other embodiments obtained by those skilled in the art without making creative efforts belong to the scope of protection of the present disclosure.

In the present disclosure, the orientations or positional relationships indicated by the terms "up", "low", "left", "right", "front", "rear", "top", "bottom", "inner", "outer", "middle", "vertical", "horizontal", "transverse", and "vertical" and so on are based on the orientations or positional relationships shown in the drawings. These terms are mainly used to better describe the present disclosure and its embodiments, rather than limiting that the indicated devices, elements or components must be in specific orientations, or be constructed and operated in specific orientations.

Moreover, some of the above terms may be used to indicate other meanings besides orientation or positional relationship, for example, the term "up" may also be used to indicate a certain attachment relationship or connection relationship in some cases. Those ordinarily skilled in the art can understand the specific meanings of these terms in the present disclosure according to specific situations.

Furthermore, the terms "mount", "dispose", "provide", "connect", "attach" are to be interpreted broadly. For example, it may be a fixed connection, a detachable connection, or an integral structure; it may be a mechanical connection, or an electrical connection; it may be directly connected, or indirectly connected through an intermediary, or internal communication between two devices, components or components. Those of ordinary skill in the art can understand the specific meanings of the above terms in the present disclosure according to specific situations.

In addition, the terms "first", "second", etc. are mainly used to distinguish different devices, elements or components (the specific types and structures may be the same or different), and are not used to demonstrate or imply the relative importance and quantity of the indicated devices, elements or components. Unless otherwise stated, "multiple" means two or more.

Referring to FIG. 1, FIG. 1 is a schematic sectional view of a ranging camera device provided in the embodiment of the present disclosure. The ranging camera device can be applied in the field of ranging camera. The transmission ratio and transmission accuracy can be improved through the worm gear and the worm screw, thereby reducing the error, and twisting and damage to the wire during rotation can be avoided through the conductive ring. The ranging camera device 10 includes a body 100, a horizontal rotating shaft 200, a conductive ring 300, a worm gear mechanism 400 and a first motor 500.

In the ranging camera device, the horizontal rotating shaft 200 is inserted in the body 100 and connected with the worm gear mechanism 400; the conductive ring 300 is inserted in the horizontal rotating shaft 200 to prevent the wire from being damaged during the rotation; the worm gear mechanism 400 is arranged on the body 100 and connected with the first motor 500; the first motor 500 is arranged on the body 100; the first motor 500 provides rotational force for the horizontal rotating shaft 200 through the worm gear 410 and the worm screw 420, and the first motor 500 drives the body 100 by the reaction force transmitted by the horizontal rotating shaft 200 to rotate around the axis of the horizontal rotating shaft 200.

Exemplarily, the first motor 500 transmits the rotational force to the worm gear mechanism 400, and then the worm gear mechanism 400 transmits the rotational force to the horizontal rotating shaft 200, the horizontal rotating shaft 200 generates a reaction force under the action of the rotational force and acts on the worm gear mechanism 400, then the worm gear mechanism 400 can drive the first motor 500 to rotate around the axis of the horizontal rotating shaft 200, so that the first motor 500 and the worm gear mechanism 400 can jointly actuate the body 100 to rotate around the horizontal rotating shaft 200, the worm gear mechanism 400 can increase the transmission ratio and transmission accuracy during transmission, hereby effectively reducing the error and improving the stability of the body 100 when rotating, and the conductive ring 300 can prevent the wire from being twisted or even damaged during the rotation of the body 100.

Exemplarily, a first through hole 210 is arranged along the axis in the horizontal rotating shaft 200; and the conductive ring 300 is inserted in the first through hole 210.

Exemplarily, the stator of the conductive ring 300 is fixedly connected to the horizontal rotating shaft 200, and the rotor of the conductive ring 300 is connected to the body 100 through wires. When the body 100 rotates under the reaction force of the horizontal rotating shaft 200, the rotor of the conductive ring 300 can be rotated together with the body 100, so that the two ends of the wire can rotate synchronously, and no twisting and damage occur.

Figure 2:
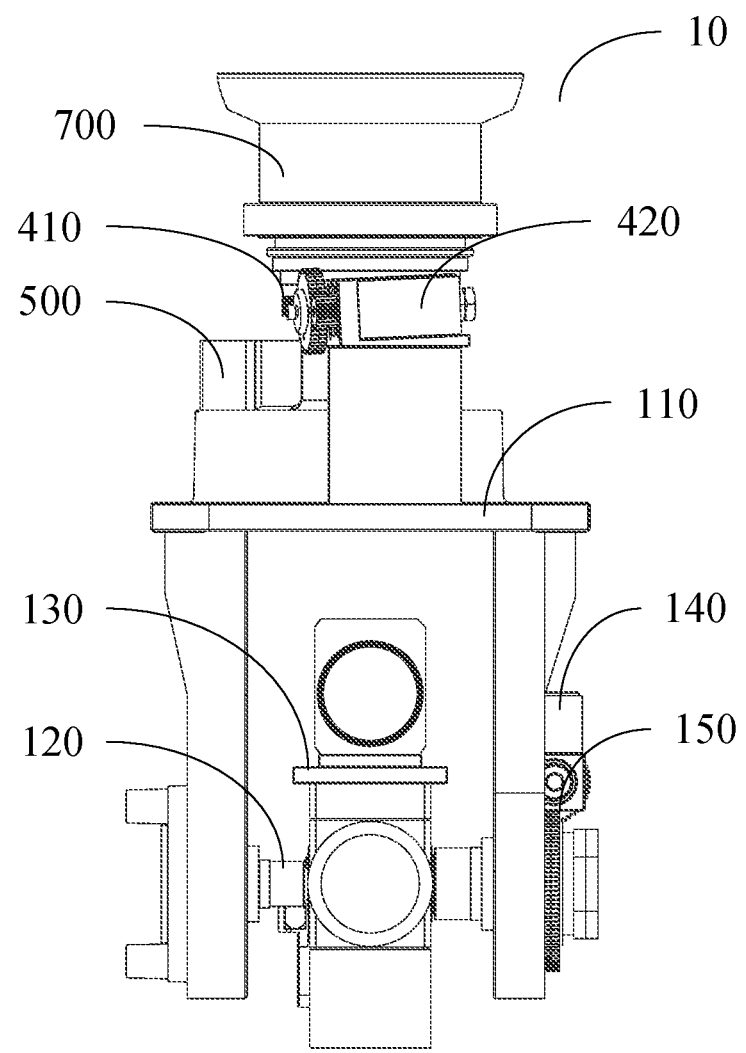
FIG. 2 is a schematic structural diagram of a ranging camera device provided by the embodiment of the present disclosure.

Referring to FIG. 2, FIG. 2 is a schematic structural diagram of a ranging camera device provided in an embodiment of the present disclosure.

Exemplarily, the worm gear mechanism 400 includes a worm gear 410 and a worm screw 420; the worm gear 410 is sleeved on the horizontal rotating shaft 200 and connected with the worm screw 420; and the worm screw 420 is arranged on the body 100 and connected with the first motor 500.

Exemplarily, the first motor 500 transmits the rotational force to the worm gear 410, then the worm gear 410 transmits the rotational force to the worm gear 410, and the worm gear 410 further transmits the rotational force to the horizontal rotating shaft 200, and the horizontal rotating shaft 200 produces a reaction force under the action of rotational force and transmits it to the worm screw 420 and the first motor 500 in reverse along the above-mentioned transmission direction, so that the worm screw 420 and the first motor 500 can rotate around the axis of the horizontal rotating shaft 200 along the direction opposite to that of the rotational force applied to the horizontal rotating shaft 200, and then the worm screw 420 and the first motor 500 drive the body 100 to rotate. The cooperation between the worm gear 410 and the worm screw 420 can improve the transmission ratio and transmission accuracy, so that the rotation of the body 100 is more stable and precise.

In one embodiment, one end of the horizontal rotating shaft 200 connected to the worm gear mechanism 400 is provided with a grating detection part 600; the grating detection part 600 is sleeved on the horizontal rotating shaft 200 for detecting the rotation angle of the body 100 relative to the horizontal rotating shaft 200.

Exemplarily, the grating detection part 600 can measure and obtain the rotation angle of the body 100 relative to the horizontal rotating shaft 200, so as to accurately locate the angular position required in the engineering operation, making the operation more convenient, and the obtained data can facilitate subsequent data analysis and processing.

In one embodiment, a tapered surface 610 is provided at the connection position between the grating detection part 600 and the horizontal rotating shaft 200; the end of the horizontal rotating shaft 200 connected with the grating detection part 600 is provided with a tapered boss 220 that cooperates with the tapered surface 610; and the horizontal rotating shaft 200 and the grating detection part 600 are tightly connected through the tapered surface 610 and the tapered boss 220.

For example, certain dimensional errors generally occur in the manufacturing process of the components, so that when the grating detection part 600 is connected to the horizontal rotating shaft 200, a certain installation gap will generate, making the connection not firm enough, and further causing the measurement data from the grating detection part 600 to have larger errors, while the tapered surface 610 and the tapered boss 220 cooperate with each other and fit closely, so that the grating detection part 600 and the horizontal rotating shaft 200 can be tightly connected, thereby improving the stability during rotation, improving measurement accuracy and reducing errors.

Exemplarily, the body 100 includes a pan-tilt 110, a vertical rotating shaft 120, a ranging camera portion 130 and a second motor 140; the pan-tilt 110 is connected with the horizontal rotating shaft 200; the vertical rotating shaft 120 is inserted in the pan-tilt 110 and connected with the second motor 140; the two ends of the ranging camera portion 130 are respectively connected with the vertical rotating shaft 120; and the second motor 140 is set on the pan-tilt 110.

Exemplarily, the first motor 500 and the worm gear mechanism 400 drive the pan-tilt 110 to rotate around the axis of the horizontal rotating shaft 200 under the reaction force of the horizontal rotating shaft 200, and further the pan-tilt 110 drives the vertical rotating shaft 120 to rotate, and the vertical rotating shaft 120 further drives the ranging camera portion 130 to rotate around the axis of the horizontal rotating shaft 200. The second motor 140 drives the vertical rotating shaft 120 to rotate around its axis, and further the vertical rotating shaft 120 drives the ranging camera portion 130 to rotate around the axis of the vertical rotating shaft 120, thereby realizing the multiple directional ranging camera function of the ranging camera portion 130.

Exemplarily, the pan-tilt 110 includes a first support arm 111 and a second support arm 112; the vertical rotating shaft 120 is respectively inserted in the first support arm 111 and the second support arm 112; the ranging camera 130 is arranged between the first support arm 111 and the second support arm 112; and the second motor 140 is disposed on the first support arm 111.

Exemplarily, the vertical rotating shaft 120 is respectively inserted in the first support arm 111 and the second support arm 112, and the vertical rotating shaft 120 can rotate relative to the first support arm 111 and the second support arm 112, the pan-tilt 110 can drive the vertical rotating shaft 120 to rotate through the first support arm 111 and the second support arm 112, and further the vertical rotating shaft 120 drives the ranging camera portion 130 to rotate.

In one embodiment, the length of the first support arm 111 and the second support arm 112 can be lengthened, such that the ranging camera portion 130 can realize 360° rotation without being hindered by the pan-tilt 110.

In one embodiment, the body 100 also includes a worm gear assembly 150; the worm gear assembly 150 is disposed on the first support arm 111, sleeved on the vertical rotating shaft 120 and connected to the second motor 140.

Exemplarily, the body 100 further includes a worm gear assembly 150, which can effectively improve the transmission ratio and precision, thereby improving the stability and accuracy of the vertical rotating shaft 120 when rotating.

In one embodiment, the ranging camera device 10 also includes a connecting base 700; the connecting base 700 is connected to the horizontal rotating shaft 200 and used for connecting with external equipment.

Exemplarily, the ranging camera device 10 further includes a connecting base 700, through which the ranging camera device 10 can be installed and fixed on external equipment, so as to meet the specific requirements of different engineering operations and facilitate operation.

In one embodiment, the ranging camera device 10 also includes a flange assembly 800; one end of the flange assembly 800 is connected to the horizontal rotating shaft 200, the other end of the flange assembly 800 is connected with the connecting base 700.

Exemplarily, through the flange assembly 800, the horizontal rotating shaft 200 and the connecting base 700 can be connected and fixed together without shaking, and the horizontal rotating shaft 200 is enabled to feed back a reaction force of equal magnitude under the action of the rotational force of the first motor 500.

To sum up, the ranging camera device 10 is installed and fixed on the external equipment through the connecting base 700. The horizontal rotating shaft 200 is connected and fixed with the connecting base 700 through the flange assembly 800. The horizontal rotating shaft 200 is inserted into the pan-tilt 110 of the body 100. The first motor 500 is arranged on the body 100, and is connected with the worm screw 420 of the worm gear mechanism 400. The worm screw 420 is arranged on the body 100 and connected with the worm gear 410 of the worm gear mechanism 400. The worm gear 410 is sleeved on the horizontal rotating shaft 200. Inside the first through hole 210 of the horizontal rotating shaft 200 is provided with a conductive ring 300. The vertical rotating shaft 120 of the body 100 is respectively inserted into the first support arm 111 and the second support arm 112 of the pan-tilt 110 and respectively connected with the both ends of the ranging camera portion 130. The first support arm 111 is provided with the second motor 140 and the worm gear assembly 150, the second motor 140 is connected with the worm gear assembly 150, and the worm gear assembly 150 is connected with the vertical rotating shaft 120. The first motor 500 transmits the rotational force to the horizontal rotating shaft 200 through the worm gear mechanism 400, hereby the horizontal rotating shaft 200 generates a reaction force that finally makes the pan-tilt 110 rotate around the axis of the horizontal rotating shaft 200 and further drives the ranging camera portion 130 to rotate around the axis of the horizontal rotating shaft 200. The second motor 140 drives the vertical rotating shaft 120 to rotate around its axis through the worm gear assembly 150, and further drives the ranging camera portion 130 to rotate around the axis of the vertical rotating shaft 120, thereby realizing the multi-directional and multi-angle adjustment of the ranging camera portion 130. The setting of the worm gear 410 and the worm screw 420 can effectively increase the transmission ratio and precision, so that the ranging camera device 10 works more stably and the rotation accuracy is higher. Through the setting of the conductive ring 300, wire twisting during the rotation can be avoided, thereby improving the working stability and safety of the ranging camera device 10.

In all the embodiments of the present disclosure, "large" and "small" are relative terms, "more" and "less" are relative terms, "up" and "low" are relative terms, and for such expressing manner of relative terms, the embodiments of the present disclosure will illustrate no further elaboration.

It should be understood that "in this embodiment", "in the embodiment of the present disclosure" or "as an optional embodiment" mentioned throughout the specification means that the specific features, structures or characteristics related to the embodiment included in at least one embodiment of the present disclosure. Therefore, "in this embodiment", "in the embodiment of the present disclosure" or "as an optional embodiment" appearing throughout do not necessarily refer to the same embodiment. Furthermore, these particular features, structures or characteristics may be mixed in any combination suitably in one or more embodiments. Those skilled in the art should also know that the embodiments described above are all optional embodiments, and the actions and modules involved are not necessarily required by the present disclosure.

In various embodiments of the present disclosure, it should be understood that the sequence numbers of the above-mentioned processes do not necessarily mean the order of execution. The execution order of each process should be determined by its function and internal logic, and should not constitute any limitation to the implementation process of the embodiment of the present disclosure.

The above is only the specific embodiments of the present disclosure, but the scope of protection of the present disclosure is not limited to these. Any person familiar with the technical field can easily think of changes or substitutions within the technical scope disclosed in the present disclosure, and all should be covered within the protection scope of the present disclosure. Therefore, the protection scope of the present disclosure should be based on the protection scope of the claims.

INDUSTRIAL APPLICABILITY

The embodiment of the present disclosure provides a ranging camera device, which is set with the worm gear and the worm screw to improve the transmission ratio and transmission accuracy, reduce the error, improve the stability during rotation, and able to prevent the wire from being entangled through the conductive ring.

What is claimed is:

1. A ranging camera device, wherein the ranging camera device comprises:
    a body, a horizontal rotating shaft, a conductive ring, a worm gear mechanism and a first motor, wherein
    the horizontal rotating shaft is inserted into the body and connected with the worm gear mechanism;
    the conductive ring is inserted into the horizontal rotating shaft to prevent a wire from being damaged during rotation;
    the worm gear mechanism is arranged on the body and connected with the first motor;
    the first motor is arranged on the body; and
    the first motor provides a rotational force for the horizontal rotating shaft through a worm gear and a worm screw, and the first motor drives the body to rotate around an axis of the horizontal rotating shaft under a reaction force transmitted by the horizontal rotating shaft.

2. The ranging camera device according to claim 1, wherein a first through hole is arranged along the axis in the horizontal rotating shaft; and
    the conductive ring is inserted into the first through hole.

3. The ranging camera device according to claim 2, wherein a stator of the conductive ring is fixedly connected to the horizontal rotating shaft, and a rotor of the conductive ring is connected to the body through wires.

4. The ranging camera device according to claim 1, wherein the worm gear mechanism comprises a worm gear and a worm screw, wherein
    the worm gear is sleeved on the horizontal rotating shaft and connected with the worm screw; and
    the worm screw is arranged on the body and connected with the first motor.

5. The ranging camera device according to claim 1, wherein one end of the horizontal rotating shaft connected to the worm gear mechanism is provided with a grating detection part; and
    the grating detection part is sleeved on the horizontal rotating shaft for detecting a rotation angle of the body relative to the horizontal rotating shaft.

6. The ranging camera device according to claim 5, wherein a tapered surface is provided at a connection position between the grating detection part and the horizontal rotating shaft;
    one end of the horizontal rotating shaft connected to the grating detection part is provided with a tapered boss matching the tapered surface; and
    the horizontal rotating shaft and the grating detection part are closely connected through the tapered surface and the tapered boss.

7. The ranging camera device according to claim 1, wherein the body comprises a pan-tilt, a vertical rotating shaft, a ranging camera portion and a second motor, wherein
    the pan-tilt is connected to the horizontal rotating shaft;
    the vertical rotating shaft is inserted into the pan-tilt and connected with the second motor;
    two ends of the ranging camera portion are respectively connected to the vertical rotating shaft; and
    the second motor is arranged on the pan-tilt.

8. The ranging camera device according to claim 7, wherein the pan-tilt comprises a first support arm and a second support arm, wherein
    the vertical rotating shaft are respectively inserted into the first support arm and the second support arm;
    the ranging camera portion is arranged between the first support arm and the second support arm; and
    the second motor is arranged on the first support arm.

9. The ranging camera device according to claim 8, wherein the vertical rotating shaft can rotate relative to the first support arm and the second support arm.

10. The ranging camera device according to claim 8, wherein the first support arm and the second support arm can be lengthened, such that the ranging camera portion can be rotated.

11. The ranging camera device according to claim 10, wherein an angle of rotation is 360°.

12. The ranging camera device according to claim 8, wherein the body further comprises a worm gear assembly; and
    the worm gear assembly is arranged on the first support arm, is sleeved on the vertical rotating shaft, and is connected with the second motor.

13. The ranging camera device according to claim 1, wherein the ranging camera device further comprises a connecting base; and
    the connecting base is connected with the horizontal rotating shaft and configured for connecting with external equipment.

14. The ranging camera device according to claim 13, wherein the ranging camera device can be mounted and fixed on the external equipment through the connecting base.

15. The ranging camera device according to claim 13, wherein the ranging camera device further comprises a flange assembly; and one end of the flange assembly is connected to the horizontal rotating shaft, the other end of the flange assembly is connected to the connecting base.

16. The ranging camera device according to claim 2, wherein the worm gear mechanism comprises a worm gear and a worm screw, wherein
   the worm gear is sleeved on the horizontal rotating shaft and connected with the worm screw; and
   the worm is arranged on the body and connected with the first motor.

17. The ranging camera device according to claim 2, wherein one end of the horizontal rotating shaft connected to the worm gear mechanism is provided with a grating detection part; and
   the grating detection part is sleeved on the horizontal rotating shaft for detecting a rotation angle of the body relative to the horizontal rotating shaft.

18. The ranging camera device according to claim 2, wherein the body comprises a pan-tilt, a vertical rotating shaft, a ranging camera portion and a second motor, wherein the pan-tilt is connected to the horizontal rotating shaft;
   the vertical rotating shaft is inserted into the pan-tilt and connected with the second motor;
   two ends of the ranging camera portion are respectively connected to the vertical rotating shaft; and
   the second motor is arranged on the pan-tilt.

19. The ranging camera device according to claim 9, wherein the first support arm and the second support arm can be lengthened, such that the ranging camera portion can be rotated.

20. The ranging camera device according to claim 9, wherein the body further comprises a worm gear assembly; and
   the worm gear assembly is arranged on the first support arm, is sleeved on the vertical rotating shaft, and is connected with the second motor.

* * * * *